United States Patent
Dulac et al.

(10) Patent No.: US 7,926,701 B2
(45) Date of Patent: Apr. 19, 2011

(54) METHOD FOR BRAZING STRIPS OF ALUMINIUM ALLOY

(75) Inventors: Sandrine Dulac, Grenoble (FR); Sylvain Henry, Saint Jean de Moirans (FR)

(73) Assignees: Alcan Rhenalu, Paris (FR); Alcan Rolled Products—Ravenswood, LLC, Ravenswood, WV (US)

( * ) Notice: Subject to any disclaimer, the term of this patent is extended or adjusted under 35 U.S.C. 154(b) by 360 days.

(21) Appl. No.: 10/596,057

(22) PCT Filed: Nov. 24, 2004

(86) PCT No.: PCT/FR2004/003002
§ 371 (c)(1),
(2), (4) Date: May 26, 2006

(87) PCT Pub. No.: WO2005/061743
PCT Pub. Date: Jul. 7, 2005

(65) Prior Publication Data
US 2007/0158386 A1 Jul. 12, 2007

(30) Foreign Application Priority Data
Nov. 28, 2003 (FR) ...................................... 03 14000

(51) Int. Cl.
*B23K 31/02* (2006.01)
*B23K 20/16* (2006.01)

(52) U.S. Cl. ................. 228/262.51; 228/262.9; 228/245; 420/528

(58) Field of Classification Search ................ 228/262.5, 228/262.51, 262.9; 420/528, 537; 428/654
See application file for complete search history.

(56) References Cited

U.S. PATENT DOCUMENTS

| | | | | |
|---|---|---|---|---|
| 3,898,053 | A * | 8/1975 | Singleton, Jr. | 428/654 |
| 4,649,087 | A | 3/1987 | Scott et al. | |
| 4,929,511 | A * | 5/1990 | Bye et al. | 428/606 |
| 5,863,669 | A * | 1/1999 | Miller | 428/654 |
| 6,234,377 | B1 * | 5/2001 | Teshima et al. | 228/183 |
| 2002/0031682 | A1 | 3/2002 | Dif et al. | |
| 2002/0041822 | A1 * | 4/2002 | Childree | 420/549 |
| 2003/0087122 | A1 | 5/2003 | Benedictus et al. | |
| 2003/0155409 | A1 * | 8/2003 | Dockus et al. | 228/245 |

FOREIGN PATENT DOCUMENTS

| | | |
|---|---|---|
| EP | 0718072 A | 6/1996 |
| EP | 1170118 A | 1/2002 |
| FR | 2489845 A | 3/1982 |
| FR | 2826979 A | 1/2003 |

OTHER PUBLICATIONS

Patent Abstract of Japan. vol. 0143, No. 56, Aug. 2, 1990 & JP 02 129333 A (Mitsubishi Alum Co. Ltd.) May 17, 1990. Abstract Example 6,7; table 1,2.

* cited by examiner

*Primary Examiner* — Jessica L Ward
*Assistant Examiner* — Devang R Patel
(74) *Attorney, Agent, or Firm* — Banner & Witcoff, Ltd.

(57) ABSTRACT

The invention relates to an aluminum alloy strip or sheet with the following composition (% by weight):
Si 0.3-1.0; Fe<1.0; Cu 0.3-1.0; Mn 0.3-2.0; Mg 0.3-3.0; Zn<6.0; Ti<0.1; Zr<0.3; Cr<0.3; Ni<2.0; Co<2.0; Bi<0.5; Y<0.5, other elements <0.05 each and 0.15 total, the remainder being aluminum,
coated on at least one face with an aluminum brazing alloy containing 4 to 15% of silicon and 0.01 to 0.5% of at least one of the Ag, Be, Bi, Ce, La, Pb, Pd, Sb, Y elements or mischmetal. Sheets and strips according to the invention can be used particularly for fluxless brazing of heat exchangers.

15 Claims, 1 Drawing Sheet

METHOD FOR BRAZING STRIPS OF ALUMINIUM ALLOY

CROSS REFERENCE TO RELATED APPLICATIONS

Applicant claims, under 35 USC §119, the benefit of priority of the filing date of a Patent Cooperation Treaty patent application, Application No. PCT/FR2004/003002, filed on Nov. 24, 2004, which is incorporated herein by reference, wherein Patent Cooperation Treaty patent application Serial Number PCT/FR2004/03002 was not published under PCT Article 21(2) in English. Applicant also claims, under 35 USC §119, the benefit of priority of the filing date of a French patent application, Serial Number FR 03 14000, filed on Nov. 28, 2003, which is incorporated herein by reference.

FIELD OF THE INVENTION

The invention relates to aluminum alloy strips coated on one or both sides with a brazing alloy, intended for manufacturing of brazed parts, and particularly heat exchangers for automobiles or buildings, and more particularly for parts assembled by fluxless brazing under a controlled atmosphere.

BACKGROUND OF THE RELATED ART

The use of structurally hardened core alloys for heat exchangers (particularly in the 6xxx series: Al—Mg—Si) was very frequent as long the vacuum brazing type process was used. This practice was terminated when the brazing technology changed and was replaced by brazing under a controlled atmosphere with Nocolok® non-corrosive flux, related to the high acquisition and maintenance costs of vacuum furnaces. The Nocolok® process imposes strict constraints on the use of magnesium alloys, since magnesium reacts with the flux used to dissolve the oxide layer, and makes it inoperative. The limit for the content is of the order of 0.3%. A very large amount of the flux would be necessary for higher contents, which would make the operation extremely expensive.

Moreover, the resistance to corrosion of a large number of strips for exchangers is based on the formation of an anodic layer at the core/cladding interface which imposes a very low content of silicon in the core. For example, this is the case of alloys described in patent EP 0326337 (Alcan).

Therefore 6xxx alloys were very largely replaced by 3xxx alloys with low magnesium and low silicon contents and the structural hardening effect was lost.

Type 3xxx core alloys with structural hardening were recently proposed, for example in patent EP 0718072 (Hoogovens Aluminum Walzprodukte) and in patent application EP 1254965 (SAPA Heat Transfer). In both cases, no modification has been made to the strips to improve their brazability in a standard Nocolok® furnace. Consequently, either the magnesium content must be limited to a relatively low value (for example less than 0.35% as in the case of application EP 1254965), but the structural hardening effect is then reduced relatively small, or the quantity of flux deposited has to be increased or an alternative flux has to be used such as cesium flux described in U.S. Pat. No. 5,771,962 (Ford). In both cases, this significantly increases the cost of the operation.

The invention is intended to propose a material that has structural hardening properties, and also good brazability in existing Nocolok® lines.

BRIEF SUMMARY OF THE INVENTION

The subject of the invention is a process for the assembly of aluminum alloy sheets as defined above including fluxless brazing under a controlled atmosphere at a temperature of between 580 and 620° C. fast cooling and possibly aging at a temperature of between 80 and 250° C. and in which at least one of the plates is composed of a core alloy with the following composition (% by weight):

Si 0.3-1.0; Fe<1.0; Cu 0.3-1.0; Mn 0.3-2.0; Mg 0.3-3.0; Zn<6.0; Ti<0.1; Zr<0.3; Cr<0.3; Ni<2.0; Co<2.0; Bi<0.5; Y<0.5; other elements <0.05 each and 0.15 total, the remainder being aluminium, and coated on at least one face with an aluminium brazing alloy containing 4 to 15% of silicon and 0.01 to 0.5% of at least one of the Ag, Be, Bi, Ce, La, Pb, Pd, Sb, Y elements or mischmetal.

The following is a preferred composition for the core alloy:

Si 0.3-1.0; Fe<0.5; Cu 0.35-1.0; Mn 0.3-0.7; Mg 0.35-0.7; Zn<0.2; Ti<0.1; Zr<0.3; Cr<0.3; Ni<1.0; Co<1.0; Bi<0.5; Y<0.5; other elements <0.05 each and 0.15 total, the remainder being aluminium, When manufacturing heat exchangers, aging can be done during operation in the hot parts of the exchanger.

DESCRIPTION OF THE INVENTION

Figure 1A:
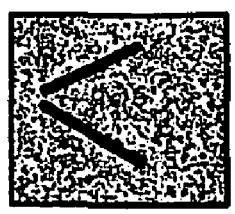
FIGS. 1a and 1b show top and side views respectively of V test pieces used in the examples to evaluate brazability.

The invention is based on the selection of a particular composition for the core alloy, for fluxless brazing, in combination with the addition of the cladding alloy containing one or several elements modifying its surface properties, such as the surface tension or the composition of the oxide layer.

The core alloy contains manganese and copper as well as silicon and magnesium to enable hardening of $Mg_2Si$ by precipitation.

The silicon content must be more than 0.3% to enable the formation of a sufficient quantity of $Mg_2Si$, but it must remain less than 1% if a sufficient difference is to be maintained between the melting temperatures of the core alloy and the cladding alloy.

The magnesium content is between 0.3 and 3.0%, and preferably between 0.35 and 0.7%. It must be sufficient to enable the formation of $Mg_2Si$, and is not limited by the risk of reaction with the flux as in patent EP 1254965, since there is no flux. Unlike the teachings of patent application EP 1254965, the objective is not to achieve an excess silicon above the stoichiometric quantity to form $Mg_2Si$, but on the contrary an excess of magnesium is required. However, magnesium can have a negative effect on formability, consequently it is desirable to limit it to 0.7% for applications requiring extensive forming.

Copper increases the mechanical strength of the alloy when it is in solid solution. Unlike the teachings of EP 1254965, the applicant did not observe any reduction in the resistance to corrosion beyond 0.3% provided that the value of 1% is not exceeded, since this is the limit at which copper precipitates. On the contrary, the presence of copper in solid solution increases the corrosion potential. Another reason for not exceeding 1% is to prevent the alloy melting temperature from dropping too much.

The cladding alloy is normally an aluminum alloy containing 4 to 15% of silicon, and possibly other additive elements such as Cu, Mg or Zn. One of the characteristics of the invention is that one or several elements are added to the cladding alloy to improve its wettability, from among the group composed of Ag, Be, Bi, Ce, La, Pb, Pd, Sb, Y and mischmetal, which is a mix of unseparated rare earth elements. This better wettability avoids the need to use a brazing flux, without operating under a vacuum.

The brazing alloy is usually clad onto the core alloy by co-rolling. If the brazing alloy is clad on a single face, the other face may be coated in a manner known by those of skill in the art by a sacrificial alloy, usually of the Al—Zn type designed to improve the resistance of the core alloy to corrosion.

The brazing alloy may also be deposited in the form of particles, particularly Al—Si particles, as for example described in patent EP 0568568 (Alcan International). For brazing under a controlled atmosphere, the brazing alloy particles are usually associated with flux particles, particularly a fluoride-based flux such as potassium fluoro-aluminate, and a binder such as a polymer resin. In this case, one particular advantage of the invention is to avoid the presence of a flux in the coating.

Between 0.05 and 0.5% bismuth and/or 0.01 to 0.5% yttrium may also be incorporated in the core alloy.

Fluxless brazing may be done under a controlled atmosphere, for example nitrogen or argon, at a temperature of between 580 and 620° C. which enables melting of the brazing alloy and also enables dissolution of the core alloy. This dissolution is followed by fast cooling, for example with blown air. The assembled part can be aged at a temperature of between 80 and 250° C.

For the manufacture of heat exchangers, it is sometimes possible to perform the aging during operation in the hottest parts of the exchanger, for example for automobile engine cooling radiator tubes.

Example

Several core alloy plates were cast with the compositions shown in Table 1:

TABLE 1

| Alloy | Si | Fe | Cu | Mn | Mg | Ti | Bi | Y | Ca |
|---|---|---|---|---|---|---|---|---|---|
| M | 0.40 | 0.22 | 0.63 | 0.57 | 0.47 | 0.08 | — | — | — |
| M + Bi | 0.39 | 0.22 | 0.62 | 0.59 | 0.49 | 0.09 | 0.15 | — | — |
| M + Y | 0.39 | 0.24 | 0.61 | 0.57 | 0.47 | 0.09 | — | 0.05 | — |
| M + Ca | 0.40 | 0.22 | 0.63 | 0.57 | 0.47 | 0.08 | — | — | 0.05 | and plates of 4047 (Al-12% Si) cladding alloy or 4047+0.19% Bi cladding alloy or 4047+0.05% Y cladding alloy or 4047+0.05% Ca cladding alloy. Assemblies are made from these plates such that the thickness of the cladding alloy is equal to 10% of the total thickness. These assemblies are hot rolled, and then cold rolled so as to produce 0.3 mm thick clad strips. The strips are subject to a recovery heat treatment for 10 h at 260° C.

Figure 1B:
Figure 2:
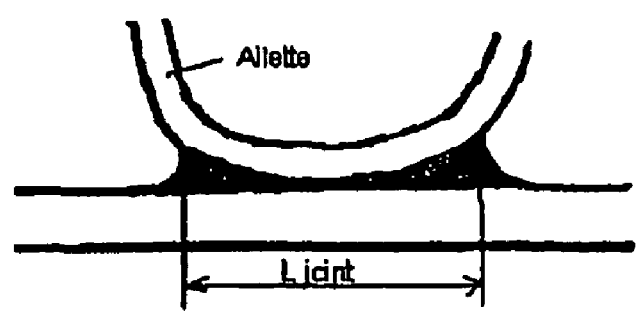
FIG. 2 shows the definition of the brazed joint width in the brazability test described in the examples.

The test piece depicted in FIG. 1 was used to evaluate the brazability of these materials. The <<V>> is composed of a 0.3 mm thick bare strip made of 3003 alloy in the H24 temper. A 15-minute degreasing treatment at 250° C. is applied to the metal to be brazed. No other surface preparation is applied and in particular no flux is deposited. Brazing is done in a double wall glass furnace so that liquid brazing movements and the formation of joints during the treatment can be viewed. The thermal cycle is composed of a rising temperature phase up to 610° C. at a rate of about 20° C./min, a 2-minute holding phase at 610° C. and a falling temperature phase at a rate of about 30° C./min. The entire operation is done under continuous scavenging by nitrogen at a rate of 8 l/min.

A mark from A to E is assigned to the results, according to the following scale:

| | Mark | | | | |
|---|---|---|---|---|---|
| | A | B | C | D | E |
| Joint length formed as a percentage of the total length | 100% | 90% | 75% | 50% | 0% |

Table 2 contains the results:

TABLE 2

| Core | Cladding | Brazability |
|---|---|---|
| M | 4047 | E |
| M | 4047 + Bi | B |
| M + Bi | 4047 + Bi | A |
| M + Y | 4047 + Y | B |
| M | 4047 + Ca | E |

The mechanical characteristics are measured on the M/4047+Bi, M+Bi/4047+Bi and M+Y/4047+Y composites together after brazing, and after various aging treatments. Table 3 shows the values obtained and compares them with an alloy N conventionally used for strips for use in heat exchangers with the following composition:

| Alloy | Si | Fe | Cu | Mn | Mg | Ti |
|---|---|---|---|---|---|---|
| N | 0.19 | 0.15 | 0.68 | 1.38 | — | 0.08 |

TABLE 3

| Composite | State | $R_m$ (MPa) | $R_{0.2}$ (MPa) | A (%) |
|---|---|---|---|---|
| M/4047 + Bi | After brazing | 202 | 95 | 9.3 |
| M/4047 + Bi | After brazing + 4 h at 180° C. | 236 | 169 | 5.8 |
| M/4047 + Bi | After brazing + 8 h at 180° C. | 236 | 191 | 3.3 |
| M + Bi/4047 + Bi | After brazing | 210 | 100 | 8.4 |
| M + Bi/4047 + Bi | After brazing + 4 h at 180° C. | 231 | 172 | 4.8 |
| M + Bi/4047 + Bi | After brazing + 8 h at 180° C. | 245 | 196 | 4.1 |
| M + Y/4047 + Y | After brazing | 207 | 95 | 9.4 |
| M + Y/4047 + Y | After brazing + 4 h at 180° C. | 240 | 170 | 6.4 |
| M + Y/4047 + Y | After brazing + 8 h at 180° C. | 256 | 198 | 5.2 |
| N/4045 | After brazing | 166 | 64 | 18.0 |
| N/4045 | After brazing + 4 h at 180° C. | 164 | 60 | 16.9 |
| N/4045 | After brazing + 8 h at 180° C. | 163 | 60 | 17.0 |

The very favourable effect of structural hardening on the mechanical strength, particularly after aging, can be seen clearly.

We claim:

1. Process for assembly of aluminum alloy plates comprising fluxless brazing of the aluminum alloy plates to form an assembly under a controlled atmosphere consisting essentially of nitrogen and/or argon at a temperature of between 580° C. and 620° C., and rapid cooling, and in which at least one of the aluminum alloy plates consists essentially of:

(a) a core alloy with composition (% by weight):
Si 0.3-1.0; Fe<1.0; Cu 0.3-1.0; Mn 0.3-2.0; Mg 0.3-3.0; Zn<6.0; Ti<0.1; Zr<0.3; Cr<0.3; Ni<2.0; Co<2.0; Bi<0.5; Y<0.5; other elements <0.05 each and <0.15 total, remainder aluminum, and (b) an aluminum brazing alloy coated as a single layer on at least one face of the core alloy, the aluminum brazing alloy including 4% to 15% of silicon and 0.01% to 0.5% of at least one element selected from the group consisting of Ag, Be, Bi, Ce, La, Pb, Pd, Sb, Y or mischmetal, the aluminum brazing alloy being free of sodium.

2. Process according to claim 1, wherein the copper content of the core alloy is between 0.35% and 1%.

3. Process according to claim 1, wherein the manganese content of the core alloy is between 0.3% and 0.7%.

4. Process according to claim 1, wherein the magnesium content of the core alloy is between 0.35% and 0.7%.

5. Process according to claim 1, wherein the zinc content of the core alloy is less than 0.2%.

6. Process according to claim 1, wherein the bismuth content of the core alloy is between 0.05% and 0.5%.

7. Process according to claim 1, wherein the yttrium content of the core alloy is between 0.01% and 0.5%.

8. Process according to claim 1, wherein the composition of the core alloy is (% by weight):
Si 0.3-1.0; Fe<0.5; Cu 0.35-1.0; Mn 0.3-0.7; Mg 0.35-0.7; Zn<0.2; Ti<0.1; Zr<0.3; Cr<0.3; Ni<1.0; Co<1.0; Bi<0.5; Y<0.5; other elements <0.05 each and <0.15 total, remainder aluminum.

9. Process according to claim 1, wherein the brazing alloy is cladded onto the core alloy by co-rolling.

10. Process according to claim 1, wherein the brazing alloy coating is composed of particles.

11. Process according to claim 1, wherein the process is used for manufacturing of heat exchangers and that aging is conducted in hot parts during operation of exchangers.

12. Process according to claim 1, comprising aging at a temperature of between 80° C. and 250° C. after rapid cooling.

13. Process according to claim 10, wherein the particles are coated by a polymer resin.

14. Process according to claim 1, wherein when only one face of the core alloy is coated with the brazing alloy, an opposed face of the core alloy is uncoated.

15. Process according to claim 1, wherein when only one face of the core alloy is coated with the brazing alloy, an opposed face of the core alloy is coated with a sacrificial Al—Zn alloy.

* * * * *